United States Patent [19]
Goodrich et al.

[11] 3,880,195
[45] Apr. 29, 1975

[54] COMPOSITE PIPELINE PRESTRESSED CONSTRUCTION

[75] Inventors: Baxter D. Goodrich, Houston, Tex.; Thomas J. Atterbury, London, Ohio

[73] Assignee: Texas Eastern Transmission Corporation, Shreveport, La.

[22] Filed: Mar. 13, 1973

[21] Appl. No.: 340,815

[52] U.S. Cl. ............... 138/172; 138/DIG. 5; 220/3; 285/288
[51] Int. Cl. .......................... F16l 9/04; B23p 11/02
[58] Field of Search ...... 138/172, 171, 176, DIG. 5; 220/3; 29/446, 421; 285/288

[56] References Cited
UNITED STATES PATENTS

| | | | |
|---|---|---|---|
| 1,763,360 | 6/1930 | Kean | 138/150 |
| 1,925,118 | 9/1933 | Stresau | 220/3 |
| 2,337,247 | 12/1943 | Kepler | 220/3 X |
| 2,480,369 | 8/1949 | Jasper | 220/3 X |
| 3,260,020 | 7/1966 | Patin | 138/176 X |
| 3,378,360 | 4/1968 | McFarland | 148/12.4 X |
| 3,762,448 | 10/1973 | Donohue | 138/171 |

FOREIGN PATENTS OR APPLICATIONS

| | | | |
|---|---|---|---|
| 916,075 | 12/1972 | Canada | 138/DIG. 5 X |

OTHER PUBLICATIONS

"Cylindrical Metal Pressure Bodies . . . With or Without Prestress," by Denoor et al., Publ.-The Am. Society of Mechanical Engrs., NY, NY, (11–70) pp. 876–893 BVS.

Pipeline Engr. Convention 1970 – "Evolution of Technique for Construction of Pressure Pipelines," by Denoor Section of BVS, Grenoble, France (11 pgs. submitted), (4–70).

Primary Examiner—Richard C. Queisser
Assistant Examiner—Daniel M. Yasich
Attorney, Agent, or Firm—Hibben, Noyes & Bicknell

[57] ABSTRACT

A composite pipeline construction is disclosed wherein a plurality of lengths of steel pipe are connected together, as by welding, to form an elongated tubular shell. One or more layers of a strengthening material, preferably low carbon, martensitic steel strap, are wrapped around the exterior of the shell. Slight clearances or gaps may be provided between the adjacent turns of the wrap of each layer and the wrapping may be done so that the gaps of one layer are covered by the material of the wrap of the next layer. The dimensions and strength of the pipe and wrap are determined so as to satisfy certain design criteria when the pipeline is operating at its normal design pressure. Prior to being placed in operation, the pipeline is subjected to a predetermined prestressing pressure, based upon the aforementioned design criteria, which is sufficient to stress the pipe portions beyond their yield strength but which is insufficient to stress the wrap beyond its yield strength. After depressurization and during subsequent operation at normal pressures, the stresses in the pipe and wrap do not exceed their respective yield strengths.

12 Claims, 5 Drawing Figures

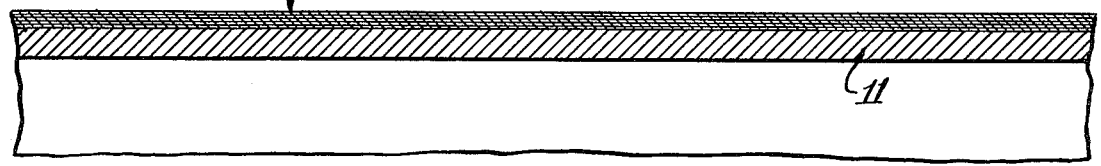
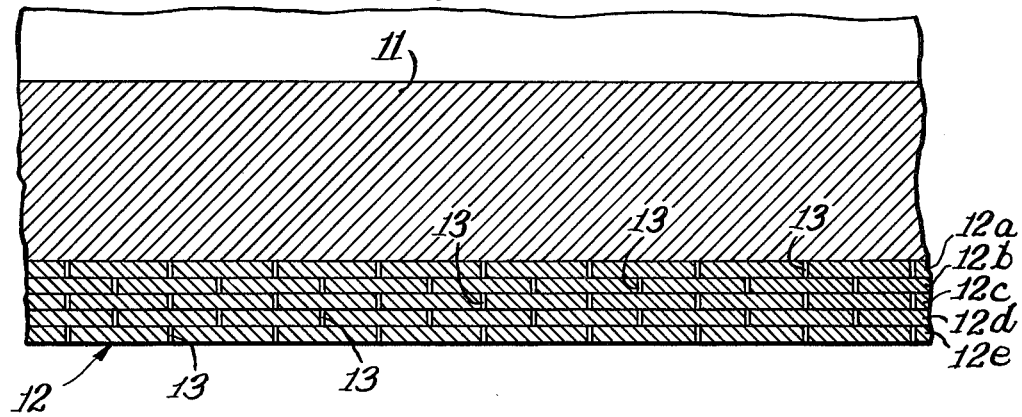
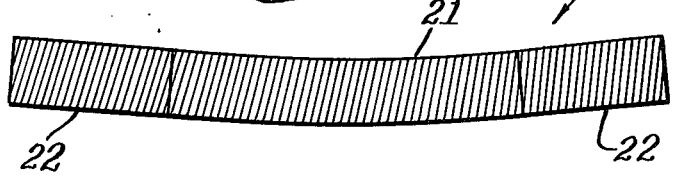

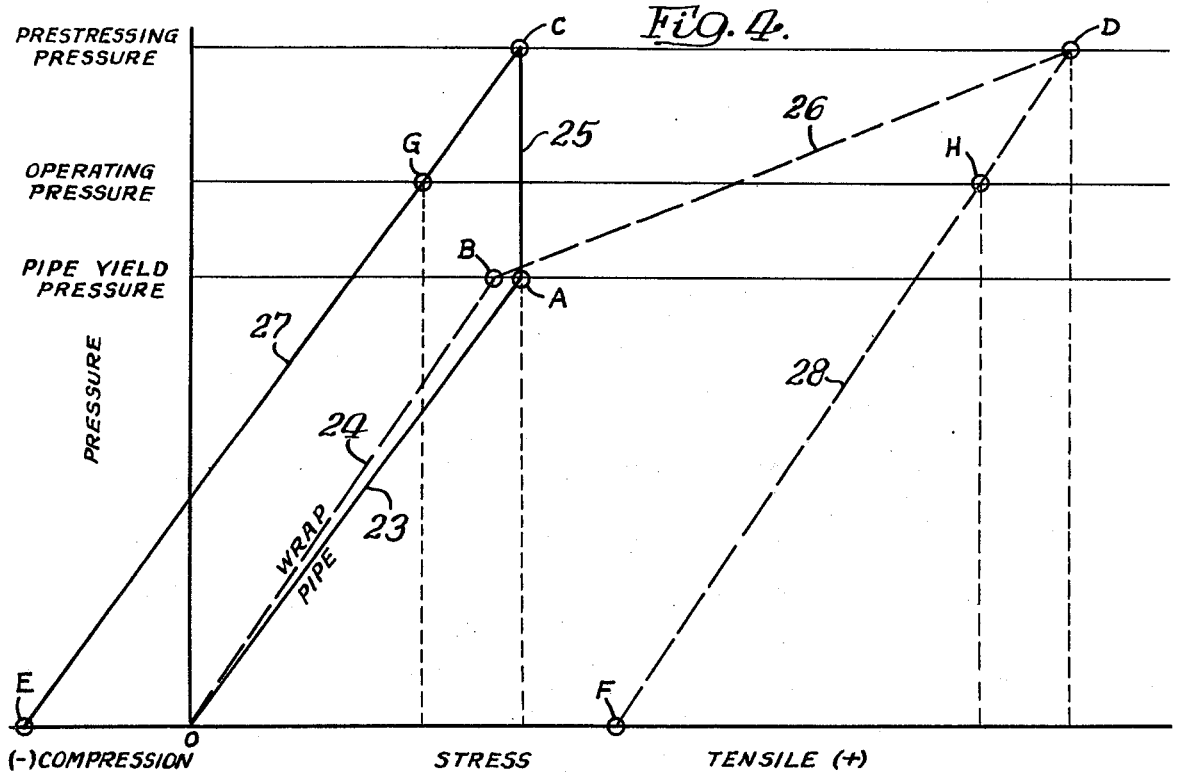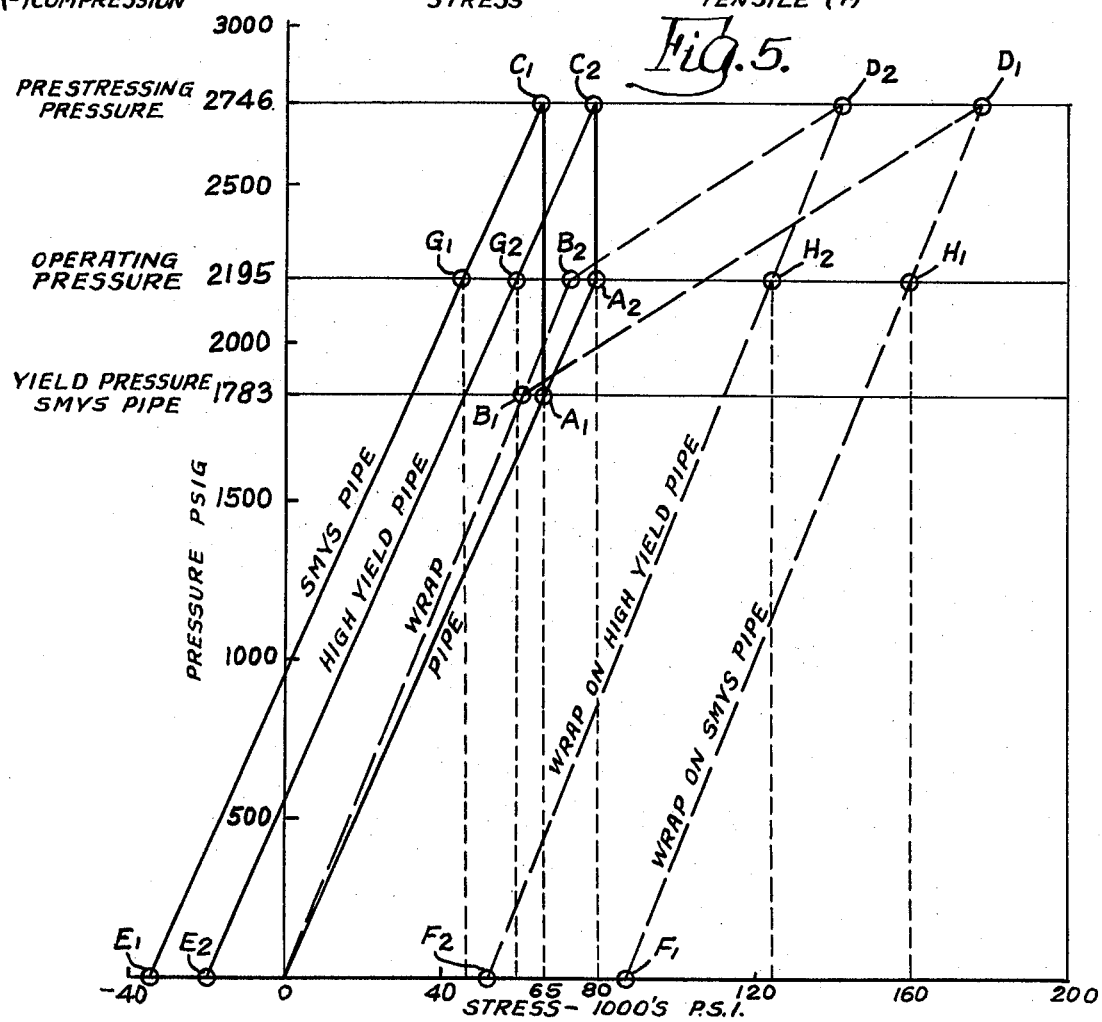

COMPOSITE PIPELINE PRESTRESSED CONSTRUCTION

This invention relates to pipelines and more particularly to a pipeline construction employing composite pipe and a method of prestressing the pipeline prior to operating the same at a normal operating pressure.

The technique of strengthening pipelines formed from substantially inelastic material incapable of appreciable plastic deformation, such as concrete, by wrapping high tensile strength material, such as steel wire, around the inelastic or fluid confining pipe portion of the structure while the high tensile strength material is under a substantial degree of tension so as to place the pipe portion under a predetermined compressive stress is well known. This method of construction, known herein as pretensioning, has been used heretofore in the construction of composite pipelines wherein the fluid confinng or pipe portion is concrete or some other material having low tensile strength characteristics. Two examples of this type of composite pipeline construction are disclosed in the Rae U.S. Pat. No. 1,107,235 and the Hirsch U.S. Pat. No. 2,627,378. The Monsch U.S. Pat. No. 1,804,888 discloses a composite pipe construction wherein the inner, fluid confining portion is steel, rather than concrete, and the Kean U.S. Pat. No. 1,763,360 discloses a reinforced pipe construction suitable for use in gas and oil pipelines, wherein cast iron pipe is utilized as the fluid confining and conveying portion of the construction and wherein one or more layers of high tensile strength steel wire or strap are wound around the exterior of the cast iron pipe while the wrap is under a high degree of tension to reinforce the pipe.

The technique of post or pressure tensioning, as contrasted to pretensioning, has also been utilized in the construction of containers or vessels for containing fluid under high pressures. Note, for example, the Williams U.S. Pat. No. 2,652,943, Kepler U.S. Pat. No. 2,337,247 and Wolff U.S. Pat. No. 3,240,644. As utilized in the pressure vessel art, pressure tensioning involves wrapping the vessel with reinforcing material under only slight tension and subjecting the wrapped vessel to an internal pressure sufficient to stress the wall of the vessel and some or all of the layers of reinforcing material wrapped around the wall beyond their yield points so that the material of the wall and reinforcing layers are permanently expanded into contact with each other.

In accordance with the present invention we have found that unexpected advantages are realized by utilizing pressure tensioning in the construction of composite steel pipelines for transmitting gas or oil under high pressure.

Accordingly, it is a general object of the present invention to provide a novel composite pipeline construction having improved strength and safety characteristics as well as having reduced weight and cost attributes.

Another object is to provide a novel composite pipeline construction wherein a plurality of steel pipe portions are connected together to provide a fluid confining and conveying shell and wherein one or more layers of high tensile strength steel strap are wrapped around the shell so as to carry a substantial portion of the pressure load in the pipeline when the latter is operating at normal pressure.

A more particular object is to provide a novel composite pipeline construction comprising a plurality of inner, fluid confining, pipe portions of elastically and plastically deformable material and an outer, strengthening portion comprising a high strength, elastically deformable material wrapped around the exterior of the pipe portions, wherein the material of the pipe portions and wrap is prestressed prior to operating the pipeline at a normal pressure by raising the internal pressure of the pipeline to a predetermined value above the normal operating pressure and wherein the prestressing pressure is such as to effect plastic deformation of the material of the pipe portions but only elastic deformation of the material of the wrap.

Still another object is to provide a novel composite pipeline construction of the foregoing character, wherein the prestressing operation compensates for variations in the yield strengths of the material of the pipe portions of the pipeline from a design specified minimum yield strength.

A further object is to provide a novel composite pipeline construction of the character described, wherein one or more layers of plain low carbon martensitic steel strap is utilized as the material of the strengthening wrap.

Other objects and advantages of the invention will become apparent from the following detailed description and accompanying sheets of drawings, in which:

FIG. 1 is a broken, fragmentary, longitudinal sectional view of a composite pipe section embodying the features of the present invention;

FIG. 2 is an enlarged sectional view of a portion of the composite pipe illustrated in FIG. 1;

FIG. 3 is a side elevational view, on a reduced scale, of a length of composite pipe constructed according to principles of the present invention and illustrating how the composite construction does not prohibit bending of the pipe;

FIG. 4 is a graph showing the variation of the stress in the pipe and wrap of a single length of composite pipe embodying the features of the invention, as the internal pressure of the pipe varies during and subsequent to a prestressing operation; and FIG. 5 is a graph similar to FIG. 4 but showing the variation of the stress in the pipe and wrap in the various sections of a composite pipeline embodying the features of the present invention, as the internal pressure of the pipeline varies during and subsequent to a prestressing operation.

Briefly described, the present invention contemplates a novel composite pipeline construction that is particularly suited for use in high pressure gas and oil transmission pipelines. The characteristics of the construction result in substantial cost savings over pipelines presently in use by virtue of a substantial reduction in the amount of material utilized in the pipeline for the load handling capabilities thereof. According to the invention, the composite pipeline construction herein contemplated comprises a plurality of tubular pipe portions of elastically and plastically deformable material and an outer strengthening portion wrapped around the pipe portions and likewise of an elastically deformable material. Preferably, the moduli of elasticity (E) of the pipe and strengthening portions are substantially equal. In the exemplary construction to be hereinafter described in detail, the inner pipe portion comprises a plurality of connected sections or joints of steel pipe and the outer, strengthening portion comprises one or more layers of high strength steel strap wrapped around the pipe portions. Plain carbon martensitic steel of low carbon content is the preferred material for the strap because of its high tensile strength characteristics and low relative cost.

When utilized in the construction of a pipeline for transmitting gas, oil and the like under high pressure, the strength characteristics and dimensions of the pipe portions and wrap of the pipeline are chosen so that after the pipeline has been constructed and prestressed, the stress in each pipe portion of the line, when the latter is operating at normal pressure, is less than the actual yield strength of the pipe portion by a predetermined classification or design factor and the stress in the wrap is less than the specified minimum yield strength of the wrap by the same classification or design factor.

The aforementioned prestressing operation is an important feature of the composite pipeline construction herein disclosed, in that it assures that the stress in the pipe portion and wrap of each composite section of the pipeline will not exceed certain design values or allowable stresses when the pipeline is operating at normal pressure. This step is performed before the pipeline is put into normal operation and involves raising the internal pressure of the pipeline to a predetermined value which is sufficient to cause the stress in all of the pipe portions of the line to reach or exceed their yield values but which is insufficient to cause the stress in the wrap surrounding the weaker pipe portions of the line to exceed the specified minimum yield strength of the wrap. Thus, during prestressing, the terminal portion of the deformation of the pipe portions is plastic, while the deformation of the wrap is entirely elastic. After depressurization and when operating at normal pressure, all of the pipe portions and wrap of the pipeline deform elastically. The prestressing procedure also assures that all of the pipe portions, including any weaker pipe portions will not be subjected to stresses greater than the class factor times their actual yield strengths when the pipeline is operating at normal pressure. Consequently, there is less danger of crack growth and a possible failure of the pipeline.

The aforementioned prestressing operation also provides another important feature of the invention in that the pipeline is self-compensating for variations in the yield strengths of the pipe portions of each composite pipe section. Thus, after prestressing and when the pipeline is operating at normal pressure, if the actual yield strength of any of the pipe portions of the line is less than the design specified minimum yield strength, then the wrap around these weaker pipe portions will carry a greater portion of the pressure load than the wrap around the pipe portions having yield strengths greater than the specified minimum. Thus, the line automatically compensates for variations in the yield strength of the individual pipe portions from the design specified minimum yield strength by permitting the wrap to assume a proportionally greater or smaller part of the pressure load.

Referring now to FIG. 1, a portion, indicated at 10, of one section or joint of a composite pipeline embodying the features of the present invention is illustrated. The portion 10 is exemplary of the construction of each section or joint of the pipeline and comprises an inner, tubular, fluid confining and conveying pipe portion 11, and an outer strengthening portion, indicated generally at 12, which encloses and engages the exterior of the pipe portion 11. Such strengthening portion 12 comprises one or more layers of high tensile strength material wrapped around the pipe portion 11 to assume a portion of the circumferential or hoop stress in the composite. As shown in FIG. 2, the strengthening means 12 comprises a plurality of layers of strap, which is preferably of high strength steel capable of undergoing both elastic and plastic deformation.

Although the strap comprising the strengthening portion 12 may be full hard cold rolled steel having a tensile strength of from about 100,000 to 120,000 p.s.i., the preferred material is a thin gauge unalloyed plain carbon steel strap of low carbon content having a microstructure consisting essentially of tempered martensite, as disclosed in the McFarland U.S. Pat. No. 3,378,360, which is incorporated herein by reference. As set forth in the McFarland patent, a typical martensitic steel composition may comprise from about 0.03 wt. % to about 0.25 wt. % carbon and from about 0.20 wt. % to about 0.60 wt. % manganese with the usual amounts of phosphorus, sulfur, and residuals. For purposes of the present invention, the martensitic steel strap may have a thickness in the range of from about 0.010 to about 0.10 inches and a width in the range of from about one-half to about 30 inches. Martensitic steel strap of the aforementioned type is characterized by a tensile strength of at least about 130,000 p.s.i. and an elongation in 2 inches of at least about 1.5%. Preferably, the tensile strength is from about 150,000 to about 250,000 p.s.i. and the elongation in 2 inches is from about 1.5% to about 10%.

The pipe portion 11 of each composite pipe section is also preferably of a high strength material, such as steel pipe, capable of undergoing both elastic and inelastic or plastic deformation. An example of one grade of pipe suitable for use in the composite pipeline construction herein contemplated is known in the industry as X65 pipe which has a specified minimum yield strength of 65,000 p.s.i. Other grades of pipe, designated in the industry as X42, X46, X52, X56, X60, X65, X70, or even up to X80 or X100, could also be used. The unit tensile strength and dimensions of the pipe portion 11 and strap 12 are based upon certain design criteria to be hereinafter described in detail.

As shown in FIGS. 1 and 2, five layers of strap are wrapped around the pipe portion 11, the layers being indicated at 12a–12e, respectively. It will be understood, however, that the width, thickness and number of layers of wrap may be varied to meet the requirements of a given pipeline. Thus, the strap may have a width of from about one-half inch to 30 inches and a thickness of from about 0.010 inches to about 0.10 inches. However, the strap illustrated in FIGS. 1 and 2 has a width of about 2.875 inches and a thickness of about 0.035 inches. The strap is preferably wound helically around the exterior of the pipe portion while under a nominal tensile stress of about 3,000 p.s.i., for example, and with a lead of about 3 inches for a 2.875 inch wide strap. Such lead is sufficient to provide small gaps, indicated at 13, between the adjacent turns of the strap of each layer. It will be understood that the width of the gaps will vary with the width of the strap. Thus for strap widths of from about one-half to 30 inches, the width of the gaps 13 may range from about 0.021 inches to about 1.25 inches. However, the width of the gaps 13 shown in FIGS. 1 and 2 is about one-eighth inch. In addition, the turns of strap in one layer are preferably axially staggered or off-set from the turns of strap in the next adjacent layer so that the gaps 13 in the respective layers are covered by the material of the strap in the next overlying layer. The provision of the gaps 13 between the turns of the strap facilitates bending of the pipe section by preventing contact between the edges of the strap on the compression side of the pipe section and possible buckling or wrinkling of the wrap when the pipe portion 11 of the pipe section is wrapped while straight or unbent, as in yard wrapping. However, when the pipe portion of any pipe section is to be wrapped after it has been bent, as in "over-the-ditch" wrapping, the gaps 13 are unnecessary. The layers of strap 12 do not longitudinally reinforce the pipe portion 11 since they are not welded or otherwise positively secured thereto and are not longitudinally restrained. As a result, the pipe portion 11 bears all of the longitudinal stress during operation of the pipeline.

Each section of the composite pipeline herein contemplated may be bent to accommodate changes in the terrain in which the pipeline is embedded. Thus, FIG. 3 illustrates the extent to which a section, indicated generally at 20, of composite pipe of the pipeline construction herein contemplated could be bent after having been wrapped with one or more layers of strengthening strap having gaps, such as the gaps 13, between the turns of the strap of each layer. Assuming that the composite section 20 is 36 feet long, has an outside diameter of 42 inches, a wall thickness of 0.42 inches, and is wrapped with five layers of strengthening strap, the maximum angle of bend of the central portion 21 thereof is about 8.57%. Since the operation of the bending machine (not shown) results in 8 foot long unbent portions 22 at each end of the pipe section 20, the bent central portion 21 of the exemplary pipe section is 20 feet long. It will thus be understood that the extent to which any composite section of the pipeline construction herein contemplated can be bent, without buckling of the wrap, depends upon several factors, including the length, outside diameter and wall thickness of the pipe portion, and the width of the gaps between the turns of strap.

Assuming that it has been decided to install a composite oil or gas transmission pipeline embodying the features of the present invention, and that the volume of flow, diameter, normal operating pressure, compressor station locations, and classification factor of the pipeline have been determined, the remaining variables are determined so that three design criteria are satisfied when the pipeline is operating at normal pressure. Such variables includes the pressure to which the line is to be subjected during the prestressing or pressure tensioning operation, the grade and wall thickness of the pipe portions of the line, and the size, number of layers and type of material of the strengthening strap to be wrapped around the connected pipe portions. The design criteria are:

1. the circumferential stress in the pipe portion of the section is equal to or less than the actual yield strength of the pipe portion multiplied by the classification factor of the pipeline;
2. the stress in the layers of wrap of the section is equal to or less than the specified minimum yield strength of the wrap multiplied by the classification factor of the pipeline; and
3. the operating pressure in the section is equal to or less than the prestressing pressure multiplied by the classification factor of the pipeline.

The specified minimum yield strength referred to in the above criteria will be hereinafter abbreviated to SMYS, and is a strength value based on tests which the manufacturer guarantees will be equalled or exceeded by the production item. It will thus be referred to in connection with both the pipe and wrap of the composite pipeline.

Before discussing the aforementioned design criteria for a complete composite pipeline, an explanation of the manner in which these same criteria are satisfied in a theoretical section of the pipeline after the pipeline has been prestressed and is operating at normal pressure will be given first.

FIG. 4 illustrates the manner in which the stress varies in the pipe portion and wrap in a theoretical section of the composite pipeline with changes in the pressure in the line during and after prestressing. The pressure-stress curve for the pipe portion is shown in full lines and the pressure-stress curve for the wrap is shown in broken lines. It is assumed that the actual yield strength of the pipe portion of the section is equal to the design SMYS of the pipe portions of the line. Further, the design stress in the wrap of the theoretical section at prestressing pressure is less than the SMYS of the wrap but greater than the SMYS of the wrap multiplied by the classification factor of the pipeline. Actual numerical values have been omitted from the graph of FIG. 4.

As will be apparent from FIG. 4, after the strengthening strap is wrapped around the pipe portion 11 and prior to any increase in pressure in the pipeline, the circumferential or hoop stress in the pipe portion and wrap are essentially zero. Actually, the strap is under a slight tension or positive circumferential stress of about 3,000 p.s.i. as a result of the wrapping operation, and the pipe is under a small compressive stress. This preload in the wrap is not shown in FIG. 4.

The aforementioned prestressing step is then carried out, which consists of increasing the internal pressure of the pipeline to the value required to satisfy the third design criterion mentioned above. The pressure in the pipeline is preferably raised by closing the ends of the line and pumping gas or liquid into the interior thereof.

As the pressure in the theoretical section increases, both the material of the pipe portion and the layers of wrap deform elastically. When the internal pressure in the pipeline reaches a value sufficient to cause the circumferential or hoop stress in the pipe portion to equal the yield strength thereof, the pipe portion will begin to deform inelastically or plastically. The yield point on the pressure-stress curve for the pipe portion of the theoretical section is indicated at A in FIG. 4, and the portion of the pressure-stress curve for the pipe portion representing the elastic deformation thereof is indicated at 23.

As the stress in the pipe portion increases toward the yield value A, the stress in the layers of wrap on the theoretical section also increases, although not at the same rate as in the pipe portion. However, when the stress in the pipe portion reaches the yield value (the point A), the stress in the wrap begins to increase at a greater rate. This point on the pressure-stress curve for the wrap is indicated at B in FIG. 4, and the portion of the pressure-stress curve of the wrap up to the point B is indicated at 24. Thus, up to the point A where the pipe portion begins to deform plastically, the wrap shares the pressure load in the section in almost a direct proportion to its thickness relative to the thickness of the wall of the pipe portion.

When the stress in the pipe portion reaches the yield value, the pipe portion will not carry any more load. Consequently, the slope of the pressure-stress curve for the pipe portion becomes substantially vertical, and the slope of the pressure-stress curve for the wrap becomes much less. This is due to the fact that the wrap is carrying substantially all of the additional pressure load as the pipe portion deforms plastically.

When the pressure in the theoretical section reaches the prestressing level, the stress in the pipe portion will be substantially the same as the yield strength. This point is indicated at C on the pressure-stress curve for the pipe portion, and the portion of the curve between the points A and C is indicated at 25.

Since the pipe portion essentially does not support any additional pressure load after the stress therein reaches the yield point A, the stress in the wrap increases at a substantially greater rate than it did up to the point B. Thus, the slope of the pressure-stress curve for the wrap changes abruptly at the point B, as mentioned above. The stress in the wrap when the section is at prestressing pressure is indicated by the point D and the portion of the pressure-stress curve for the wrap between the points B and D is indicated at 26. The stress in the wrap at the point D is greater than its allowable stress when the pipeline is operating at normal pressure and less than the SMYS of the wrap, as heretofore mentioned.

After the prestressing pressure is reached and maintained for a predetermined period, the pipeline is depressured. As the pressure in the line drops to zero, the stress in the pipe portion follows the portion of the pressure-stress curve indicated at 27 in FIG. 4, and the stress in the wrap follows the portion of the pressure-stress curve indicated at 28. At zero pressure, the pipe portion will be under a significant negative stress or compression, as indicated by the point E, and the wrap will be under a substantial positive or tensile stress, as indicated by the point F. Thereafter, the stress in the pipe portion and wrap of the theoretical section of the pipeline heretofore described will vary with changes in the pressure in the line in accordance with the portions 27 and 28 of their respective pressure-stress curves. Thus, both the pipe portion and wrap will deform elastically when the pipeline is subjected to pressures up to the prestressing pressure, and the circumferential or hoop stress in the pipe portion and wrap of the theoretical section of the pipeline will both be equal to or less than their allowable stresses when the pipeline is operating at normal pressure. The allowable stress in the pipe portion of the theoretical section is equal to the actual yield strength of the pipe portion multiplied by the classification factor of the pipeline, and the allowable stress of the wrap is equal to the SMYS of the wrap multiplied by this same classification factor.

FIG. 5 illustrates the manner in which the stress varies in the pipe portions and wrap in a plurality of sections of a composite pipeline with changes in the pressure in the line during and after prestressing. It will be assumed that the actual yield strengths of the pipe portions of the pipeline are the same as or greater than the SMYS. By definition the yield strength of the SMYS pipe portions of the line is 65,000 p.s.i. and the yield strength of the pipe portions designated as "high yield" is 80,000 p.s.i. It will be assumed that the actual yield strength of the wrap is equal to or greater than its SMYS, namely, 200,000 p.s.i. The same letters have been used to identify the various points on the pressure-stress curves in FIG. 5 which correspond with those on the graph of FIG. 4. It should be pointed out that the design criteria for an actual composite pipeline embodying the features of the present invention are substantially the same as those for the previously described theoretical section of the pipeline when the latter is operating at normal pressure. These design criteria are as follows:

1. The circumferential stress in the pipe portions of the pipeline is equal to or less than the actual yield strength of the respective pipe portions multiplied by the classification factor of the pipeline;
2. The stress in the layers of wrap around the SMYS pipe portions of the pipeline is equal to or less than the specified minimum yield strength of the wrap multiplied by the classification factor of the pipeline; and
3. the operating pressure in the pipeline is equal to or less than the prestressing pressure multiplied by the classification factor.

The physical characteristics of the pipe portion and wrap of the various sections of the pipeline to which the pressure-stress curves in FIG. 5 pertain are as follows:

Pipe: O.D. — 42 inches; Wall thickness — 0.420 inches; Grade — X65 having a SMYS of 65,000 p.s.i.

Wrap: Material-unalloyed plain carbon martensitic steel having an SMYS of 200,000 p.s.i.; Width — 2.875 inches; Thickness — 0.035 inches; Number of layers — five; Wrap lead — 3 inches; Width of gaps — 0.125 inches.

Referring now to FIG. 5, it will be seen that after the pipe portions have been welded together and wrapped with the required number of layers of strengthening strap, and after the prestressing operation is initiated by increasing the pressure in the pipeline, the pipe portions of the various sections of the pipeline will yield at different pressure levels due to the different actual yield strengths of the respective pipe portions. Thus, the point $A_1$ identifies the pressure at which the pipe portions of the pipeline having a yield strength equal to the specified minimum start to yield, and the point $A_2$ identifies the pressure at which the "high yield" pipe portions of the pipeline begin to yield. It will be understood that many of the pipe portions of the pipeline will have yield strengths between that of the SMYS pipe (65,000 p.s.i.) and the high yield pipe (80,000 p.s.i.) and will yield at intermediate pressures. It will also be understood that a few of the pipe portions may have actual yield strengths that are less than the SMYS pipe. However, for the sake of simplicity, the pressure-stress curves for such pipes are not shown in Fig. 5.

The points $B_1$ and $B_2$ on the pressure-stress curves for the wrap respectively identify the points at which the wrap on the SMYS and high yield pipe portions begin to rapidly increase. The points $C_1$ and $C_2$ respectively identify the circumferential or hoop stress levels in the SMYS and high yield pipe portions of the pipeline when the pressure in the line is at the prestressing level. The stresses represented by the points $C_1$ and $C_2$ are substantially the same as the stresses $A_1$ and $A_2$. The points $D_1$ and $D_2$ respectively identify the stresses in the wrap surrounding the SMYS and high yield pipe portions when the pressure in the pipeline is at the prestressing level.

The points $E_1$ and $E_2$ respectively identify the residual compressive or negative stress in the SMYS and high yield pipe portions after the prestressing pressure has been reduced to zero. Similarly, the points $F_1$ and $F_2$ respectively identify the residual tensile or positive stress in the wrap surrounding the SMYS pipe and high yield portions after the prestressing operation.

The points $G_1$ and $G_2$ respectively identify the circumferential or hoop stresses in the SMYS and high yield pipe portions when the pipeline is operating at normal pressure. In the exemplary composite pipeline, such stresses are 45,000 and 60,000 p.s.i., respectively. The tensile stress in the wrap surrounding the SMYS and high yield pipe portions are identified at $H_1$ and $H_2$, respectively, in FIG. 5. The stresses represented by these points are 160,000 and 124,000 p.s.i., respectively.

From the foregoing it will be noted that, as a result of the prestressing operation, the circumferential or hoop stresses in all of the pipe portions of the pipeline at operating pressure are less than the design specified minimum yield strength (SMYS) of the line, i.e. 65,000 p.s.i., and that the tensile stresses in the wrap surrounding the respective pipe portions are all less than the specified minimum yield strength of the wrap i.e. 200,000 p.s.i. The actual yield strength of some of the wrap may be less than the specified minimum, but the incidence of such wrap is negligible. The stress in the wrap surrounding the SMYS pipe (point $H_1$) is equal to the design allowable stress based upon a classification factor of 0.8. In this regard, it has been assumed that no strain hardening occurs in the pipe portions as a result of the prestressing operation and that the classification factor of the previously described exemplary pipeline and in the design criteria is 0.8. Different classification factors could, of course, be used in different installations, e.g. 0.4, 0.5, 0.6 or 0.72.

Application of the aforementioned criteria in the design of a composite pipeline results in a pipeline which is "self-compensating" for variations in the yield strengths of the pipe portions of the line when the latter is operating at normal pressure. This self-compensating feature results from the stress levels that are achieved in the pipe portion and wrap of each section of the pipeline after the prestressing operation has been performed and the pipeline is operating at normal pressure. As previously described in connection with the explanation of FIG. 5, when the pipeline is operating at normal pressure, none of the pipe portions are subjected to a circumferential or hoop stress greater than its actual yield strength, and the stress in the material of the wrap never exceeds the specified minimum yield strength of the wrap. The end result is that if the actual yield strength of any of the pipe portions is greater than the design specified minimum yield strength, these stronger pipe portions will bear a greater portion of the pressure load than the wrap thereon than if the actual yield strengths of these pipe portions were equal to the specified minimum. Conversely, if any of the pipe portions of the pipeline have yield strengths which are lower than the design specified minimum, these weaker pipe portions will bear a smaller portion of the pressure load than the wrap thereon than if the actual yield strengths of these pipe portions were equal to the specified minimum. For a conventional pipeline designed to operate at a classification factor of 0.8 and in which the SMYS of the pipe is 65,000 p.s.i., for example, the operating stress in all of the pipe portions of the line would be 0.8 times 65,000 p.s.i. or 52,000 p.s.i. For the pipe portions of this pipeline having an actual yield stress of 60,000 p.s.i., the ratio of operating stress to yield stress would be 52,000 ÷ 60,000 or 86.7%. Since growth of flaws is generally considered to be a function of the percentage of the yield strength at which the pipe is operating, fracture initiation is less likely with a composite system. Thus, the extra margin of strength in the pipe portion and wrap of each section of the composite pipeline herein described permits the stress in any section of the pipeline to be distributed between the material of the pipe portion and wrap in accordance with the relative strengths of these materials. Since it is highly unlikely that any section of the pipeline will have a pipe portion and wrap whose yield strengths are both less than the design specified minimum for the line, a safety factor is thus provided.

A test was conducted to evaluate the fracture arrest characteristics of the composite pipe construction herein described. The test section employed seven joints or lengths of composite pipe, each having an O.D. of 42 inches and a wall thickness of 0.420 inches. The joints ranged in length from 31 feet 3 inches to 36 feet. All of the joints were wrapped with five layers of high tensile strength martensitic steel strap of the character herein described. The strap in each layer was 0.035 inches thick and 2.875 inches wide, and each layer of strap was wound with a 3 inch pitch. A fracture initiating explosive device was mounted substantially at the center of the test section and on the girth weld of two of the joints so as to cut a longitudinal slot approximately 1 foot long in the wrap and pipe material of both joints. The grade of the pipe in one of these joints was what is known in the industry as 5LX65CE, and the grade of the pipe in the other of these joints was X65C. The transition temperatures of these joints was chosen so that at the test temperature, the fracture in one of these joints would be ductile and the fracture in the other joint would be brittle. Prior to the test, the entire test section was prestressed by hydrotesting the same at a pressure of 2750 p.s.i.g. At the time of the test the test section was filled with natural gas at a pressure of 2195 p.s.i.g.

After the fracture initiating device was fired, a shear fracture propagated into the ductile joint but was arrested about 13 feet 8 inches from the girth weld of the two joints, and two fractures propagated into the brittle joint but were arrested about 9 feet 4 inches from the girth weld. The results of this test clearly establish that the composite pipe construction quickly arrested the fractures in both joints.

The composite pipeline construction herein described, particularly where martensitic steel strap is utilized as the wrapping material, and the method of prestressing the same prior to placing the pipeline in use, results in a number of advantages over pipeline constructions presently in use to transmit gas, oil, or other flowable materials under high pressure. Some of these are:

1. Substantial savings in the cost of materials resulting from the higher strength per dollar of the material of the wrap as compared to the material of the pipe;

2. Substantial savings in construction costs resulting from a reduction in the permissible thickness of the material of the wall of the pipe portions;
3. Substantial savings in transportation and freight costs due to a reduction in the total weight of the pipeline;
4. Reduction in the thickness of the wrap, as compared to full hard cold rolled steel, and reduction in the linear feet of wrap used, as compared to wire, due to the use of high tensile strength martensitic steel strap as the wrapping material;
5. Increased safety and reliability of operation resulting from the redundancy of the multiple layers of wrap, i.e. a failure of or more of the layers may not result in a failure of the pipeline;
6. Avoidance of biaxial stresses and multiple point contact between the layers of wrap due to the use of the strap form of the strengthening material instead of a multiple wire form;
7. Reduction of wrapping costs due to the use of the strap instead of the wire form of strengthening material;
8. Self-compensation for variations in the yield strengths of the pipe portions of the pipeline from a design specified minimum yield strength resulting from satisfaction of the design criteria;
9. Obviating complex and highly stressed strap winding equipment which would be required if the strap were to be wound around the shell portion of the pipeline under a high pretension; and
10. Minimization of fracture propagation in the event of a failure in the pipeline.

We claim:

1. A composite construction for use in a high pressure pipeline, comprising at least one tubular pipe portion adapted to contain and transmit fluid under pressure, and at least one layer of high tensile strength strap wrapped around the outer surface of said pipe portion and longitudinally unrestrained relative thereto whereby said strap does not longitudinally reinforce said pipe portion, said pipe portion and said strap both being of elastically deformable material and having substantially the same modulus of elasticity, said strap having a yield strength greater than the yield strength of said pipe portion and being operable to carry a substantial portion of the pressure load in said composite construction when the latter is operating at a normal pressure, said strap being of Martensitic steel having a tensile strength of at least about 130,000 psi and said composite construction being prestressed prior to being operated at a normal pressure by increasing the internal pressure therein to a value sufficient to exceed the yield strength of said pipe portion but insufficient to exceed the yield strength of said strap.

2. The composite construction of claim 1, further characterized in that the turns of said strap are spaced from each other to provide gaps therebetween, said gaps facilitating bending of said composite construction.

3. The composite construction of claim 2, further characterized in that a plurality of layers of said strap are wrapped around said pipe portion, and said layers are staggered so that the gaps in one layer are covered by the strap of the next overlying layer.

4. The composite construction of claim 2, further characterized in that said gaps have a width of from about 0.021 to about 1.25 inches dependent upon the strap width.

5. The composite construction of claim 4, further characterized in that the width of said strap is from about one-half to about 30 inches.

6. The composite construction of claim 1, further characterized in that said pipe portion comprises high strength steel pipe.

7. A composite pressure tensioned pipeline construction for transmitting fluid under high pressure, comprising a plurality of connected, elastically and plastically deformable metal pipe portions, and at least one layer of high tensile strength, elastically deformable metal strap wrapped around each of said pipe portions, said strap being of steel having a tensile strength of at least 100,000 psi and being longitudinally unrestrained relative to said pipe portions whereby said strap does not longitudinally reinforce said pipe portions and said strap being operable to carry a portion of the pressure load in the respective pipe portions, said pipe portions having an actual yield strength that is equal to or greater than a specified minimum except for a few pipe portions having an actual yield strength less than said specified minimum, substantially all of said strap having an actual yield strength that is equal to or greater than a specified minimum, the specified minimum yield strength of said strap being greater than the actual yield strength of all of said pipe portions, and said pipeline being prestressed by the strap and pressure tensioned to a predetermined internal pressure, prior to being operated at a normal operating pressure less than said predetermined internal pressure, by increasing the internal pressure therein to a value sufficient to exceed the actual yield strength of all of said pipe portions but insufficient to exceed the specified minimum yield strength of said strap, whereby the prestressed pipeline during operation is self-compensating for variations in the actual yield strength of said pipe portions.

8. The composite pipe construction of claim 7, further characterized in that said strap is of plain carbon steel having a carbon content of from about 0.03 wt. % to about 0.25 wt. % and a microstructure consisting essentially of tempered martensite.

9. The composite construction of claim 1 further characterized in that said martensitic steel comprises a plain carbon steel having a carbon content of from about 0.03 wt% to about 0.25 wt% and a microstructure consisting essentially of tempered martensite.

10. The composite pipeline construction of claim 7, further characterized in that said pipeline has a classification factor, and said normal operating pressure is equal to or less than said classification factor multiplied by said predetermined internal pressure.

11. The composite pipeline constructed of claim 10, further characterized in that the stress in any pipe portion when said pipeline is operating at said normal operating pressure is equal to or less than said classification factor multiplied by the actual yield strength of that pipe portion.

12. The composite pipeline construction of claim 11, further characterized in that the stress in the strap around the pipe portions having actual yield strengths equal to their specified minimum when said pipeline is operating at normal pressure is equal to or less than said classification factor multiplied by the specified minimum yield strength of said strap. strap.

* * * * *